US012339180B2

(12) United States Patent
Choi et al.

(10) Patent No.: US 12,339,180 B2
(45) Date of Patent: Jun. 24, 2025

(54) COMBINED FLEXIBLE TACTILE SENSORS

(71) Applicants: Jae-Won Choi, Copley, OH (US); Md. Omar Faruk Emon, Hamden, CT (US)

(72) Inventors: Jae-Won Choi, Copley, OH (US); Md. Omar Faruk Emon, Hamden, CT (US)

(73) Assignee: THE UNIVERSITY OF AKRON, Akron, OH (US)

( * ) Notice: Subject to any disclaimer, the term of this patent is extended or adjusted under 35 U.S.C. 154(b) by 310 days.

(21) Appl. No.: 18/076,290

(22) Filed: Dec. 6, 2022

(65) Prior Publication Data

US 2023/0175900 A1 Jun. 8, 2023

Related U.S. Application Data

(60) Provisional application No. 63/286,284, filed on Dec. 6, 2021.

(51) Int. Cl.
*G01L 1/18* (2006.01)
*B82Y 15/00* (2011.01)
*B82Y 40/00* (2011.01)

(52) U.S. Cl.
CPC .............. *G01L 1/18* (2013.01); *B82Y 15/00* (2013.01); *B82Y 40/00* (2013.01)

(58) Field of Classification Search
CPC ............ G01L 1/18; B82Y 15/00; B82Y 40/00
See application file for complete search history.

(56) References Cited

U.S. PATENT DOCUMENTS

| 2015/0109006 A1* | 4/2015 | Choi | G01L 1/04 |
| | | | 264/105 |
| 2020/0200623 A1* | 6/2020 | Choi | G01H 11/06 |

* cited by examiner

*Primary Examiner* — Jamel E Williams
(74) *Attorney, Agent, or Firm* — RENNER KENNER GREIVE BOBAK TAYLOR & WEBER

(57) ABSTRACT

A tactile sensor including a first insulating layer, a first sensing layer of a first conductive soft polymer material, a second sensing layer of a second conductive soft polymer material and a second insulating layer. The first sensing layer includes first electrically conductive strip located therein and the first sensing layer is positioned above the first insulating layer. The second sensing layer includes second and third electrically conductive strips located therein and the second sensing layer is positioned above the first sensing layer. The second and third electrically conductive strips are arranged within a first plane located within the second sensing layer, separated by the second conductive soft polymer material. The first and second electrically conductive strips are arranged within a second plane transverse to the first plane, separated by the first conductive soft polymer material. The second insulating layer is positioned above the second sensing layer. The first and second electrically conductive strips are connected to a first impedance measuring device. The second and third electrically conductive strips are connected to a second impedance measuring device.

20 Claims, 8 Drawing Sheets

COMBINED FLEXIBLE TACTILE SENSORS

CROSS-REFERENCE TO RELATED APPLICATIONS

This application claims priority from U.S. Provisional Application No. 63/286,284 entitled "Combined Tactile Sensors and Their Signal Processing to Measure Normal and Shear Deformation" filed on Dec. 6, 2021, the contents of which are incorporated herein by reference.

FIELD OF THE INVENTION

Embodiments of the present invention relate to force measuring sensors and methods of fabricating the same. Particularly, embodiments of the present invention relate to the use of force sensors that utilizes multiple sensing elements that are arranged in an array within two or more sensing layers to measure changes in force acting upon the sensor. More particularly, embodiments of the present invention relate to force measuring sensors that are arranged in a manner in which both shear and normal forces can be measured.

BACKGROUND OF THE INVENTION

Rigid sensors fall short of providing a solution in many applications where bending and flexing are needed. The hard sensors can also cause discomfort in wearable devices. Stretchable and flexible sensors overcome many limitations of rigid sensors as they can conform and stretch without obstructing the primary movement of a device.

Over the last few decades there has been a growing interest in soft and stretchable force sensors. Soft and stretchable force sensors have a wide range of applications including health monitoring, robotics, prosthetics, etc. Promising applications of soft sensors in the biomedical fields include simulated electronic skins, biological assessments, and drug delivery platforms. Flexible and stretchable sensors are also crucial for robotics. Soft sensors were reported in various robot applications, e.g., small-scale, gripping, underwater, and harsh-environment applications. The primary sensing mechanism of the soft sensors is usually based on the mechanical strains observed by the sensing elements. Various elastomers were employed in the fabrication of these sensors due to their viscoelastic properties.

There are several approaches for creating soft pressure sensors. Previous soft force sensors are generally capable of measuring tensile, compressive, or bending actions. Previous soft shear sensors have been hindered by inferior sensitivity (i.e. spatial resolution) and rigid specifications (large size), without facile modifications depending on the target application.

There are opportunities for advancement on soft polymeric sensors for simultaneous normal and shear sensing. Sensors with the capability of measuring normal and shear force could be vital for human-machine interfacing. Soft shear sensors could be crucial for areas such as robotics, wearables, and prosthesis. Biomedical applications can be a major area to implement these sensors. For example, clinical gait analysis to study walking patterns could be hugely benefitted from the integration of a shear sensor. Shear data can offer more information about biomechanics, and it can be useful in assessing podiatric conditions. Moreover, it can also be valuable in understanding tire mechanics, sports equipment, and consumer health monitoring devices.

Therefore, there is a need for a force sensor that includes discrete force sensing elements that are able to achieve any desired level of force sensing resolution that is capable of measuring both the normal and shear forces acting upon it.

SUMMARY OF THE INVENTION

An embodiment of the present invention provides a tactile sensor including a first insulating layer having a first and second major surface formed from a non-conductive material, a first sensing layer comprising a first conductive soft polymer material and a first electrically conductive strip located within the first sensing layer, and wherein said first sensing layer is positioned above said first insulating layer, a second sensing layer comprising a second conductive soft polymer material and a second and third electrically conductive strips are separated by the second conductive soft polymer material and are arranged within a first plane located within the second sensing layer, where the first and second electrically conductive strips are separated by the first conductive soft polymer and are arranged within a second plane transverse to the first plane and wherein said second sensing layer is positioned above said first sensing layer, a second insulating layer formed from a non-conductive material positioned above said second sensing layer, and wherein the first conductive soft polymer material has a first intrinsic conductivity, wherein the second conductive soft polymer material has a second intrinsic conductivity, wherein the first and second intrinsic conductivities are different, wherein both the first and second electrically conductive strips are connected to a first impedance measuring device, wherein both the second and third electrically conductive strips are connected to a second impedance measuring device.

Another embodiment of the present invention provides a tactile sensor as in any embodiment above, wherein the first and second electrically conductive strips are separated by a distance of 0.01 mm or greater.

Another embodiment of the present invention provides a tactile sensor as in any embodiment above, wherein the second and third electrically conductive strips are separated by a distance of 0.01 mm or greater.

Another embodiment of the present invention provides a tactile sensor as in any embodiment above, wherein said first and second electrically conductive strips include conductive nanostructures dispersed in a flexible support material, wherein said conductive nanostructures are selected from the group consisting of conductive nanowires, carbon nanotubes, and graphene, and wherein said carbon nanotubes are selected from the group consisting of multi-walled carbon nanotubes or single wall carbon nanotubes.

Another embodiment of the present invention provides a tactile sensor as in any embodiment above, wherein electrically conductive strips contain from 0.01 wt % to 20 wt % carbon nanotubes and wherein said carbon nanotubes have an average length from 300 nanometers to 30 microns.

Another embodiment of the present invention provides a tactile sensor as in any embodiment above, wherein the first and second conductive soft polymer materials are selected from the group consisting of polymers containing ionic compounds, including ionic liquids and ionic salts, ionic particle based soft conductive polymers, and soft polymer having intrinsic conductivity.

Another embodiment of the present invention provides a tactile sensor as in any embodiment above, wherein the first conductive soft polymer material is a polymer containing ionic compounds selected from the group consisting of 1-ethyl-3-methylimidazolium tetrafluoroborate (EMIBF4) with the $T_g$ of −95.15° C.; 1-ethyl-3-methylimidazolium bis(trifluoromethylsulfonyl)imide (EMITFSI) with the $T_g$ of −98.15° C.; and 1-butylpyridinium tetrafluoroborate (BPBF4) with the $T_g$ of −66.7° C.

Another embodiment of the present invention provides a tactile sensor as in any embodiment above, wherein the second conductive soft polymer material is a polymer containing ionic compounds selected from the group consisting of 1-ethyl-3-methylimidazolium tetrafluoroborate (EMIBF4) with the $T_g$ of −95.15° C.; 1-ethyl-3-methylimidazolium bis(trifluoromethylsulfonyl)imide (EMITFSI) with the $T_g$ of −98.15° C.; and 1-butylpyridinium tetrafluoroborate (BPBF4) with the $T_g$ of −66.7° C.

Another embodiment of the present invention provides a tactile sensor as in any embodiment above, wherein the weight percent of the ionic liquid based upon the total weight of the ionic liquid polymer within the sensing layers is selected from the group consisting of from 0.01 or more to 10 or less weight percent (wt %) of ionic liquid, from 0.05 or more to 7.5 or less weight percent (wt %) ionic liquid, from 0.5 or more to 5 or less weight percent (wt %) ionic liquid, and from 1 or more to 2.5 or less weight percent (wt %) ionic liquid.

Another embodiment of the present invention provides a tactile sensor as in any embodiment above, wherein the ionic liquid polymer is a pressure sensitive polymer.

Another embodiment of the present invention provides a tactile sensor as in any embodiment above, wherein the first and second impedance measuring device are voltage dividers.

Another embodiment of the present invention provides a tactile sensor as in any embodiment above, wherein said first insulating layer and said second insulating layer are stretchable.

Another embodiment of the present invention provides a tactile sensor as in any embodiment above, wherein the non-conductive material of said first insulating layer and the non-conductive material of said second insulating layer are selected from the group consisting of elastomers, polymers, and thermoplastics, wherein the elastomers are selected from the group consisting of polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluoresilicone, fluoroelastomers, perfluorelastomers, polyether block amines, chlorosulfonated polyethylene, ethylene-vinyl acetate, thermoplastic elastomer, polyurethane, and mixtures thereof, and wherein the non-conductive material of said first insulating layer can be the same or different than the non-conductive material of said second insulating layer.

Another embodiment of the present invention provides a tactile sensor as in any embodiment above, wherein the tactile sensor detects: applied force such as normal and shear forces, the proximity of the applied force, slip events, slip direction, slip speed, slip velocity, temperature changes, rolling contact, the shape of an object in contact with said tactile sensor, and vibration.

Another embodiment of the present invention provides a tactile sensor as in any embodiment above, wherein said first electrically conductive strip and said third electrically conductive strip are connected to a third impedance measuring device.

An embodiment of the present invention provides a method of making a tactile sensor including: preparing a first layer by pouring a first insulating soft polymer formed from a non-conductive material into a first mold, curing the insulating soft polymer to from the first layer, preparing a second layer by: depositing a mixture of prepolymer and carbon nanotubes into a second mold on top of the first layer to form a first array of conductive strips, curing the first array of conductive strips, pouring a first conductive soft polymer material into the second mold to cover the first array of conductive strips, and curing the first conductive soft polymer material to form the second layer, preparing a third layer by: depositing a mixture of prepolymer and carbon nanotubes into a third mold on top of the second layer to form a second array of conductive strips, curing the first array of conductive strips, pouring a second conductive soft polymer material into the third mold to cover the second array of conductive strips, and curing the second conductive soft polymer material to form the third layer, preparing a fourth layer by pouring a second insulating soft polymer formed from a non-conductive material into a third mold on top of the second layer, curing the second insulating soft polymer to form the fourth layer, connecting a first conductive strip of the first array of conductive strips and a second conductive strip of the second array of conductive strips to a first impedance measuring device, and connecting the second conductive strip of the second array of conductive strips and a third conductive strip of the second array of conductive strips to a second impedance measuring device.

Another embodiment of the present invention provides a method of making a tactile sensor as in any embodiment above, wherein the mixture of prepolymer and carbon nanotubes is deposited via a micro-dispensing head, or screen printing and wherein the deposited mixture is directly cured into strips using UV light or thermal curing.

Another embodiment of the present invention provides a method of making a tactile sensor as in any embodiment above, wherein the first and second conductive soft polymers are selected from the group consisting of ionic-liquid polymer, particle based soft conductive polymers, and soft polymers having intrinsic conductivity.

Another embodiment of the present invention provides a method of making a tactile sensor as in any embodiment above, wherein the first and second conductive soft polymer materials are an ionic-liquid polymer selected from the group consisting of 1-ethyl-3-methylimidazolium tetrafluoroborate (EMIBF4) with the Tg of −95.15° C.; 1-ethyl-3-methylimidazolium bis(trifluoromethylsulfonyl)imide (EMITFSI) with the Tg of −98.15° C.; and 1-butylpyridinium tetrafluoroborate (BPBF4) with the Tg of −66.7° C.

Another embodiment of the present invention provides a method of making a tactile sensor as in any embodiment above, wherein the non-conductive material of said first insulating soft polymer material and the non-conductive material of said second insulating soft polymer material are selected from group consisting of elastomers, polymers, and thermoplastics, wherein the elastomers are selected from the group consisting of polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluoresilicone, fluoroelastomers, perfluorelastomers, polyether block amines, chlorosulfonated polyethylene, ethylene-vynyl acetate, thermoplastic elastomer, polyurethane, and mixtures thereof, and wherein the non-conductive material of said first insulating soft polymer material can be the same or different than the non-conductive material of said second insulating soft polymer material.

DETAILED DESCRIPTION OF ILLUSTRATIVE EMBODIMENTS

The present invention relates to tactile sensors and to methods of making them. In some embodiments, the present invention further relates to tactile sensors that are developed using direct-write technology to lay down, within a flexible medium, multiple conductive strips of electrically conductive carbon nanotubes mixed within a polymer matrix.

Figure 1A:
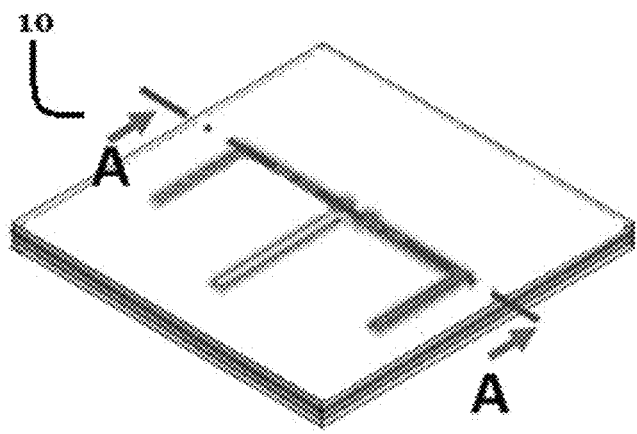
FIG. 1A is a schematic view of one embodiment of a tactile sensor of the present invention comprising two insulating layers and three conductive strips located within at least two sensing layers positioned between the two insulating layers.
Figure 1B:
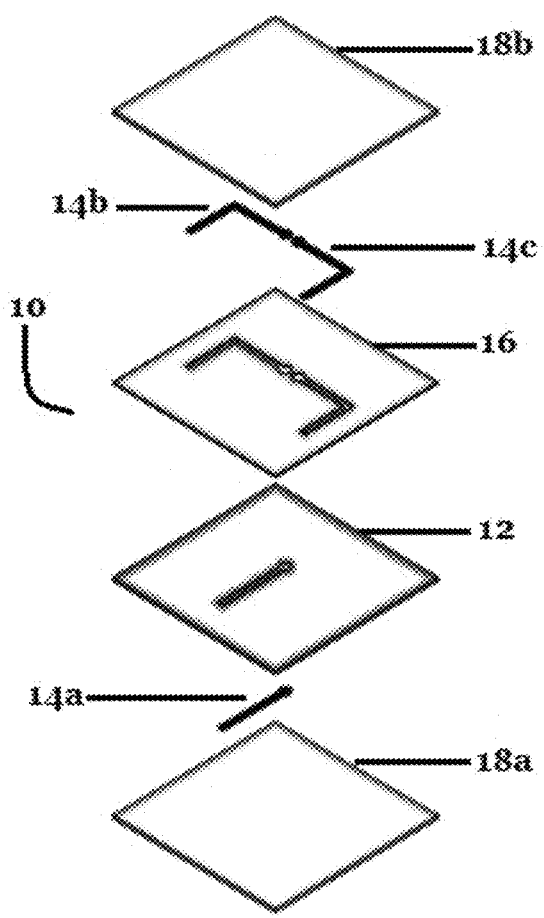
FIG. 1B is an exploded schematic view of the tactile sensor of FIG. 1A.

With reference to FIGS. 1A and 1B, one embodiment of the present invention provides tactile sensor 10 comprising electrically conductive strips 14a, 14b, and 14c, two insulating layers 18a and 18b, first sensing layer 12 and second sensing layer 16. The electrically conductive strips 14a, 14b, and 14c can be aligned as straight strips, two-dimensional curved strips, three-dimensional curved strips, wavy patterned strips. The electrically conductive strips can also be aligned into any designed pattern as long as the three conductive strips 14a, 14b, and 14c are located in a specific manner within first sensing layer 12 and second sensing layer 16. While it is understood that the term plane is a 2-dimensional concept, when referencing the relationship between two conductive strips 14b and 14c are within the same first plane within the second sensing layer, it is meant that if you take a first planar cross-section through any portion of conductive strip 14b while sensor 10 is at rest, it will be within the same first plane as conductive strip 14c. Stated another way, if 14b exists in a first cross-sectional plane, a portion of 14c will also exist on that same first plane when sensor 10 is at rest. Likewise, when referencing the relationship between two conductive strips 14a and 14b are within the same second plane within the sensing layers, it is meant that if you take a second planar cross-section through any portion of conductive strip 14a while sensor 10 is at rest, it will be within the same second plane as conductive strip 14b. Stated another way, if 14a exists in a second cross-sectional plane, a portion of 14b will also exist on that same second plane when sensor 10 is at rest.

Conductive strip 14a is connected to conductive strip 14b and to a first impedance measuring device 18a. Conductive strip 14b is connected to conductive strip 14c and to a second impedance measuring device 18b. In some embodiments the first and second impedance measuring devices also includes a source of power. In yet other embodiments, in addition to being connected to an impedance measuring devices 18a, 18b, the conductive strips 14a and 14b, and 14b and 14c are also connected to one or more power supplies (not shown). In some embodiments, the impedance measuring device is a voltage divider or potential divider, which includes a voltage source in series with a resistor. The impedance measuring device can be any such device known in the art. Impedance measuring devices work by applying a known or measured force to one or both of the two conductive strips 14a and 14b while simultaneously measuring the change in impedance of the portion of the first sensing layer 12 located within the same second plane and between the two conductive strips 14a and 14b while sensor 10 is at rest. Then, the change in resistance or voltage is related back to the applied force. This relation back is then used to calculate a new, unknown force. Likewise, impedance measuring devices work by applying a known or measured force to one or both of the two conductive strips 14b and 14c while simultaneously measuring the change in impedance of the portion of the second sensing layer 16 located within the same first plane and between the two conductive strips 14a and 14b while sensor 10 is at rest. Then, the change in resistance or voltage is related back to the applied force. This relation back is then used to calculate the force applied to the sensor based on known properties of the sensor. Further, impedance devices 18a and 18b may be a single impedance device.

The embodiment in FIGS. 1A and 1B shows first and second sensing layers 12 and 16 having one or two electrically conductive strips 14a or 14b and 14c, respectively, located therein and located within the first plane and the second plane as described above. Although this embodiment only shows one or two electrically conductive strips 14a or 14b and 14c, within sensing layers 12 and 16, respectively, sensors of the present invention can have any number of electrically conductive strips located within sensing layers 12 and 16. As shown in FIG. 1B, there needs to be at least some of a single sensing layer 12 or 16 located in the same horizontal plane and between the two conductive strips 14a and 14b or 14b and 14c such that none of the conductive strips 14a, 14b and 14c are in direct contact with one another and are only connected through an impedance measuring device and/or power supply.

Sensor 10 formed by connecting the conductive strips 14a and 14b, and 14b and 14c has better sensing capabilities for sensing and differentiating between the application of normal force coming from various directions as well as the application of shear forces on sensor 10. The displacement and/or deformation of the portion of the first sensing layer 12 located in the same second plane as and between the two conductive strips 14a and 14b is very sensitive to the changes in resistance. The displacement and/or deformation of the portion of the second sensing layer 16 located in the same first plane as and between the two conductive strips 14b and 14c is very sensitive to the changes in resistance. Any change in resistance of the conductive strips 14a, 14b and 14c are negligible when the resistance of first and second sensing layers 12 and 16 are maintained to be much greater than that of the conductive strips 14a, 14b and 14c.

Figure 2A:
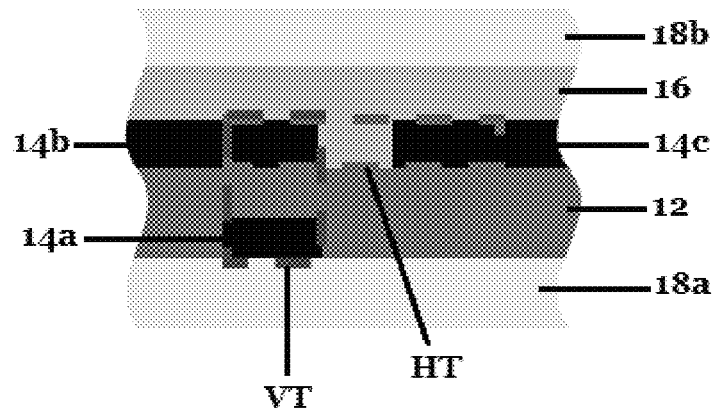
FIG. 2A is a schematic representation of a cross-sectional view A in FIG. 1A showing the relationship of the conductive strips and sensing layers located between two insulating layers.

FIG. 2A shows a cross-sectional view of sensor 10 along the perspective A labeled in FIG. 1A. FIG. 2A shows the positioning of conductive strips 14a, 14b, and 14c within a sensor 10 at rest according to an embodiment of the present invention. As shown in FIG. 2A, only material comprising first sensing layer 12 is present in the space in the same second plane between conductive strips 14a and 14b. Likewise, only material comprising second sensing layer 16 is present in the space in the same first plane between conductive strips 14b and 14c. The dashed lines around portions of conductive strip 14a, first sensing layer 12, and conductive strip 14b is referenced as vertical taxel VT. The dashed lines around portions of conductive strip 14b, second sensing layer 16, and conductive strip 14c is referenced as horizontal taxel HT. A taxel is also known as a "tactile-pixel" and is able to detect shear and normal deformations as the result of forces applied to the sensor. The orientation of the taxel within a sensor allows it to be mostly sensitive to normal forces applied in that orientation, while maintaining the ability to detect shear forces.

Only the portions of first and second sensing layers 12 and 16 that are located in the same horizontal plane as and between conductive strips 14a, 14b and 14c is shown in FIGS. 2B, 3A, 3B, and 3C because these are the portions of first and second sensing layers 12 and 16 most sensitive to changes in resistance, but first and second sensing layers 12 and 16 are also understood to be present in the areas immediately around conductive strips 14a, 14b and 14c in accordance with FIGS. 1A and 1B.

Figure 2B:
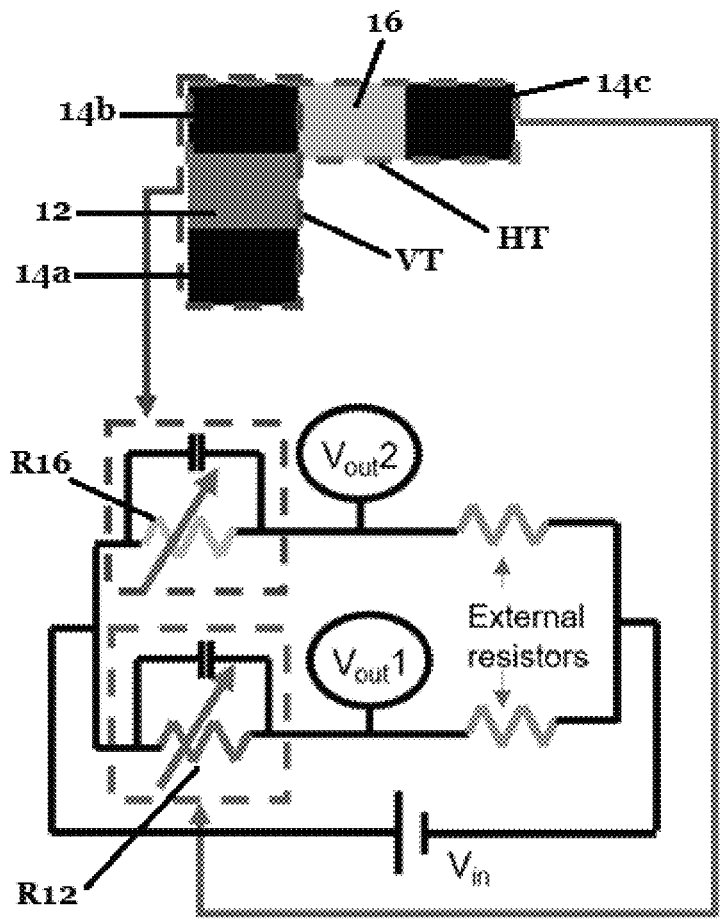
FIG. 2B is a partial view of FIG. 2A and additionally shows an exemplary circuit diagram according to an embodiment of the present invention.

Using the embodiment of sensor 10 as shown in FIG. 1A when a normal force is applied on sensor 10 (compression in this case), the displacement of the conductive strips 14a and 14b is normal to each other. However, when shear force is applied on sensor 10, the displacement of the conductive strips 14a and 14b is parallel to each other. When shear force is applied on sensor 10, the displacement of conductive strips 14b and 14c is normal to each other. Any force resulting in the deformation of first sensing layer 12 between the conductive strips 14a and 14b contributes to a change in the electrical resistance of the sensor, and dependent upon the type of force applied, either normal force in the form of tension or compression, or in the form of shear force, the sensor response is recorded and the data produced shows which type of force was applied and the amount of said force applied to sensor 10. This change may be reported as voltage $V_{out2}$ as shown in FIG. 2B. Likewise, any force resulting in the deformation of second sensing layer 16 between the conductive strips 14b and 14c contributes to a change in the electrical resistance of the sensor, and dependent upon the type of force applied, either normal force in the form of tension or compression, or in the form of shear force, the sensor response is recorded and the data produced shows which type of force was applied and the amount of said force applied to sensor 10. This change may be reported as voltage $V_{out1}$ as shown in FIG. 2B.

Figure 3A:
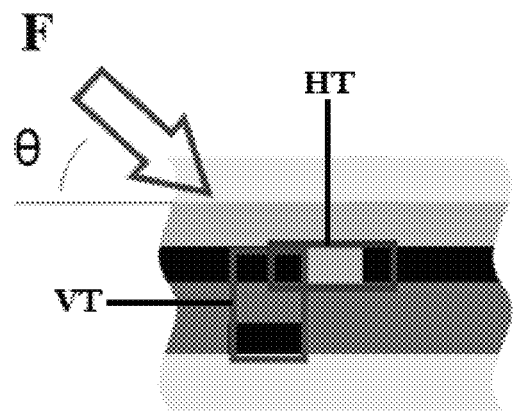
FIG. 3A is a schematic cross-sectional view of the direction of an arbitrary force acting upon a sensor according to an embodiment of the present invention.
Figure 3B:
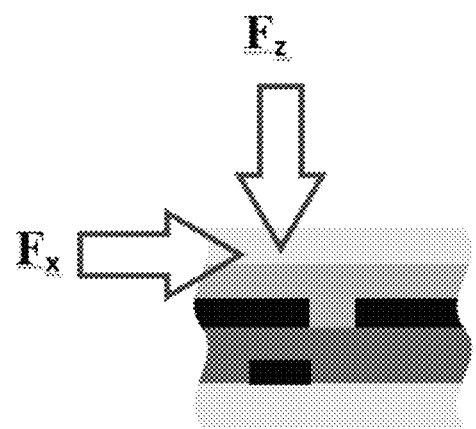
FIG. 3B is a schematic a cross-sectional view of the direction of the component forces of an arbitrary force acting upon a sensor according to an embodiment of the present invention.
Figure 3C:
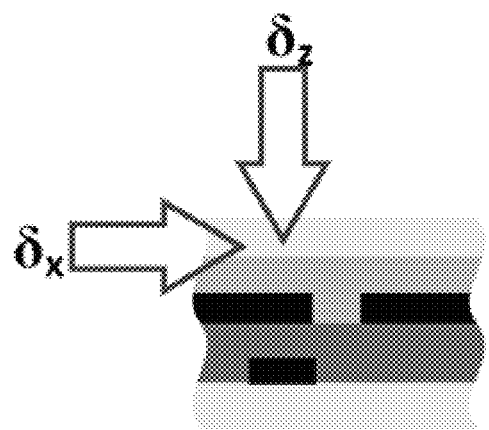
FIG. 3C is a schematic a cross-sectional view of the direction of deformation resulting from the application of an arbitrary force acting upon a sensor according to an embodiment of the present invention.

FIG. 3A shows when arbitrary force F at arbitrary angle θ acts upon a sensor according to the present invention including horizontal taxel HT and vertical taxel HT. As shown in FIG. 3B, arbitrary force F is the sum of vertical force $F_z$ and horizontal force $F_x$. As shown in FIG. 3C arbitrary force F and its component forces $F_z$ and $F_x$ causes deformation of the sensor in vertical and horizontal directions, $\delta_z$ and $\delta_x$, respectively.

Figure 4:
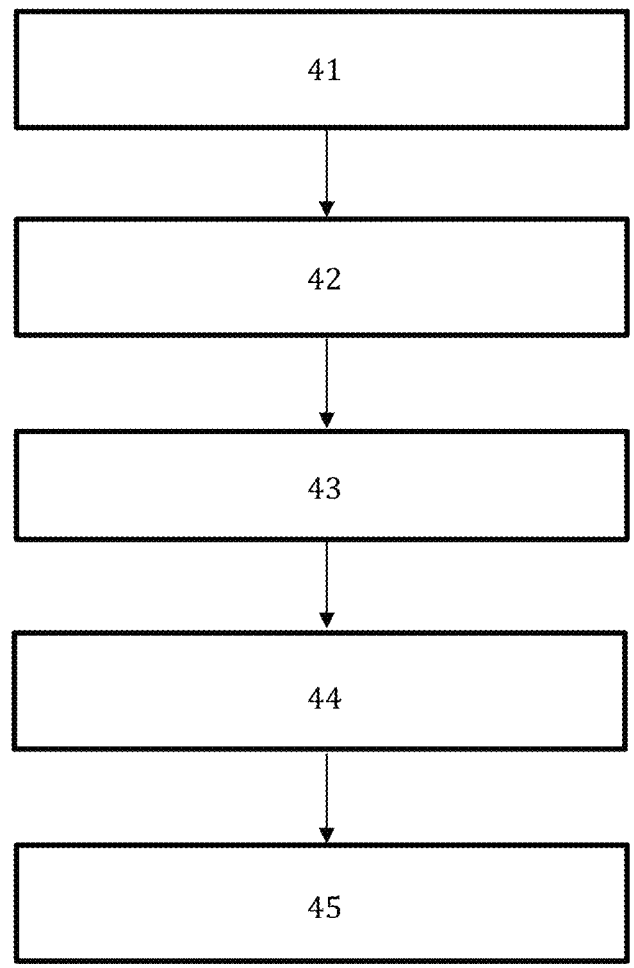
FIG. 4 is a diagram showing the method of detecting a force exerted on a sensor according to the present invention.

FIG. 4 is representative of a method of measuring an arbitrary force acting upon a tactile sensor according to embodiments of the present invention. In a first step 41, a tactile sensor according to embodiments of the present invention is provided and connected with an impedance device. In second step 42, an arbitrary force, including component forces $F_z$ and $F_x$ is applied upon a tactile sensor according to embodiments of the present invention resulting in deformation in vertical (normal) and horizontal (shear) directions, $\delta_z$ and $\delta_x$, respectively. In third step 43, the resulting change in the relative resistance of the sensing layers due to the deformation of the sensing layers between the conductive strips is measured using the output from the vertical and horizontal taxels. In fourth step 44, the output from the vertical and horizontal taxels is subjected to post-processing to calculate the deformation in vertical (normal) and horizontal (shear) directions, $\delta_z$ and $\delta_x$, respectively, which is then used to calculate the component forces $F_z$ (normal) and $F_x$ (shear), which are combined to provide the force vector. In fifth step 45, the tactile sensor according to an embodiment of the present invention returns to rest.

In some embodiments, there is only one insulating layer, and in other embodiments, there are multiple insulating layers. The insulating layer or layers are formed from non-conductive flexible material while the sensing layers should have a conductivity of between about 50 MΩ and about 500 MΩ. The insulating layer(s) needs to be formed of a non-conductive material so that the insulating layer(s) do not interfere with the conduction of the conductive strips 14a and 14b, as will be appreciated to a better degree after further disclosures herein. In some embodiments, suitable materials for the insulating layers are selected from elastomers, polymers, and thermoplastics. In some embodiments, elastomers may be selected from polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluoresilicone, fluoroelastomers, perfluorelastomers, polyether block amines, chlorosulfonated polyethylene, ethylene-vynyl acetate, thermoplastic elastomer, and polyurethane, or mixtures thereof. In one or more embodiments, the insulating layer(s) is made from polyurethane. When multiple layers are employed to create the sensor, the layers may be the same or different.

In some embodiments, first and second sensing layers 12 and 16 is formed from a conductive soft polymer material. The conductive soft polymer material can be selected from the group consisting of polymers containing ionic compounds, including ionic liquids and ionic salts, ionic particle based soft conductive polymers, and soft polymer having intrinsic conductivity. An example of a soft conductive polymers include carbon nanotubes (CNTs) in polydimethylsiloxane (PDMS) and an example of soft polymers having intrinsic conductivity include TangoPlus FullCure™ 930), polyacetylene, polypyrrole, polyaniline, and there copolymers. In one embodiment, the conductive soft polymer material of the sensing layers is an ionic liquid based soft polymer.

Ionic liquids (ILs) are defined as a salt in the liquid state, consisting of ions and short-live ion pairs. IL's are a green media due to their superior characteristics of non-flammability, non-volatility, high ion conductivity, high thermal stability, and high chemical stability. When IL's are used in an embodiment, they are strictly restricted to salts whose melting points are relatively low, such as lower than about 100° C. In some embodiments the IL's are selected from 1-ethyl-3-methylimidazolium tetrafluoroborate (EMIBF4) with the Tg of −95.15° C.; 1-ethyl-3-methylimidazolium bis(trifluoromethylsulfonyl)imide (EMITFSI) with the Tg of −98.15° C.; and 1-butylpyridinium tetrafluoroborate (BPBF4) with the Tg of −66.7° C., which can be in-situ polymerizable. Higher ionic conductivity can be generated from high ion mobility, high ion density and low polymer glass transition temperature (Tg).

Without wishing to be bound by theory, it is believed that the sensitivity of the sensor is variable upon the concentration of IL within a sensing layer.

In one or more embodiments, the IL-polymer used as the sensing layers comprise from 0.01 or more to 10 or less weight percent (wt %) IL based upon the total weight of the polymer used in the sensing layers, in another embodiment, from 0.05 or more to 7.5 or less wt % IL, in another embodiment, from 0.5 or more to 5 or less wt % IL, and in yet another embodiment, from 1 or more to 2.5 or less wt % IL, based upon the total weight of the sensing layers.

In one or more embodiments, the IL-polymer is also a pressure sensitive polymer.

It is further understood that the ability of a single sensor with multiple (i.e. two or more sensing layers) to detect normal, slip, or shear force direction is enhanced with the two or more sensing layers are distinct. Distinct is understood to mean where each sensing layer included in a sensor has unique electrical properties. These unique electrical properties may be the result of using different polymers, different ILs, different loadings of ILs (wt. %), different shapes, etc.

In some embodiments the relative difference in resistance between any two sensing layers within a sensor is 1% or greater. In other embodiments, 2% or greater. In other embodiments, 3% or greater. In other embodiments, 4% or greater. In other embodiments, 5% or greater. In other embodiments, 6% or greater. In other embodiments, 7% or greater. In other embodiments, 8% or greater. In other embodiments, 9% or greater. In other embodiments, 10% or greater. In other embodiments, 15% or greater. In other embodiments, 20% or greater. In other embodiments, 25% or greater. In other embodiments, 30% or greater. In other embodiments, 35% or greater. In other embodiments, 40% or greater. In other embodiments, 45% or greater. In other embodiments, 50% or greater. In other embodiments, 75% or greater. In other embodiments, 100% or greater. In other embodiments, 150% or greater. In other embodiments, 200% or greater.

In some embodiments the relative difference in resistance between any two sensing layers within a sensor is 200% or less. In other embodiments, 150% or less. In other embodiments, 100% or less. In other embodiments, 75% or less. In other embodiments, 50% or less. In other embodiments, 45% or less. In other embodiments, 40% or less. In other embodiments, 35% or less. In other embodiments, 30% or less. In other embodiments, 25% or less. In other embodiments, 20% or less. In other embodiments, 15% or less. In other embodiments, 10% or less. In other embodiments, 9% or less. In other embodiments, 8% or less. In other embodiments, 7% or less. In other embodiments, 6% or less. In other embodiments, 5% or less. In other embodiments, 4% or less. In other embodiments, 3% or less. In other embodiments, 2% or less. In other embodiments, 1% or less.

In some embodiments the relative difference in resistance between any two sensing layers within a sensor is from about 1% to about 200%. In other embodiments, from about 1% to about 150%. In other embodiments, from about 1% to about 100%. In other embodiments, from about 1% to about 75%. In other embodiments, from about 1% to about 50%. In other embodiments, from about 1% to about 45%. In other embodiments, from about 1% to about 40%. In other embodiments, from about 1% to about 35%. In other embodiments, from about 1% to about 30%. In other embodiments, from about 1% to about 25%. In other embodiments, from about 1% to about 20%. In other embodiments, from about 1% to about 15%. In other embodiments, from about 1% to about 10%.

Conductive strips 14a, 14b, and 14c comprise conductive nanostructures dispersed in a flexible support material. As used herein, the term "conductive nanostructure" is meant to include conductive nanowires, carbon nanotubes (CNTs), and graphene. In one embodiment, the flexible support material is a polymer. The polymer may be virtually any flexible polymer. In some embodiments, the conductive strips have a width of from 5 microns or more to 3 mm or less. In some embodiments, the conductive strips have a width of from 10 microns or more to 2 mm or less. In some embodiments, the conductive strips have a width of 10 microns or more to 1 mm or less.

Embodiments of the present invention use CNTs for their mechanically strong, electrically conductive, and piezoresistive properties. The carbon nanotubes can be single-walled or multi-walled. Single-walled nanotubes are carbon nanotubes where the tube has only one layer. Multi-walled nanotubes are carbon nanotubes where the tube has more than one layer. These nanotube structures and additional nanotube structures are known by those skilled in the art.

In some embodiments, the CNTs have exceptionally high aspect ratios of from 500 or more to 1000 or less. In some embodiments, the CNTs have high Young's modulus of 0.64 TPa or higher. In some embodiments, the CNTs have a high stiffness of 1,000 GPa or higher. In some embodiments, the CNTs have high tensile strength of 100 GPa or higher. In some embodiments, the CNTs have a bulk density of 1.4 g/cm$^3$ or lower. In some embodiments, the CNTs have a bulk density in the range of about 0.15 g/cm$^3$ to about 1.3 g/cm$^3$. In other embodiments, the CNTs have the ability to withstand large strain rates of from 6% or more to 10% or less. In addition to their outstanding physical and mechanical properties, CNTs show exceptional electrical properties. Depending on their radius or chirality, CNTs can be metallic or semiconducting, and both are suitable for use in accordance with the present invention.

Metallic CNTs have exceptionally low electrical impedance of around 0.5Ω, and piezoresistivity (gauge factor around 600 to 1000 in a small scale). Dispersing CNTs into a polymer matrix reinforces the polymer in order to ameliorate the mechanical properties, and also embeds a highly conductive electrical element within the polymer.

The length of the CNTs can have an effect on the tunneling resistance of the conductive strips, and, for more sensitive sensors, it is preferred that the CNTs be short to produce more junctions between neighboring CNTs along the length of the strips. In some embodiments, the CNTs have an average length from 300 nanometers or more to 30 microns or less. In other embodiments, the CNTs have an average length from 500 nanometers or more to 20 microns or less. In other embodiments, the CNTs have an average length from 1 micron or more to 5 microns or less.

In some embodiments, the carbon nanotubes have a purity of more than 85 wt %, a diameter from 10 to 30 nm, and a length from 5 to 20 μm.

In one or more embodiments, the conductive structures are metal nanowires. The metal nanowires can be made from copper, silver, gold, or mixtures thereof. The metal nanowires can be made from any conductive metal that is known in the art as being able to form nanowires.

The length of the nanowires can have an effect on the tunneling resistance of the conductive strips, and, for more sensitive sensors, it is preferred that the nanowires be short to produce more junctions between neighboring nanowires along the length of the strips. In some embodiments, the nanowires have an average length from 300 nanometers or more to 30 microns or less. In other embodiments, the nanowires have an average length from 500 nanometers or more to 20 microns or less. In other embodiments, the nanowires have an average length from 1 micron or more to 5 microns or less.

The graphene additions are generally planar and will have length and width dimensions. In some embodiments, the length and width is from 300 nanometers or more to 30 microns or less. In other embodiments, the length and width is from 500 nanometers or more to 20 microns or less. In other embodiments, the length and width is from 1 micron or more to 5 microns or less.

The prepolymer used to form the carbon nanotube-filled polymer can be any stretchable prepolymer that is capable of mixing with carbon nanotubes and showing conductivity after mixing and curing. The prepolymer is mixed with carbon nanotubes before being polymerized to form the electrically conductive strips 14a and 14b.

The prepolymer is mixed with a curing agent in order to cure the solution into strips. The curing agent can be thermally initiated by adding heat, or can be initiated by light, such as with UV, visible, or infrared light, depending on the photoinitiator.

For ease of manufacture, in one or more embodiments, the prepolymer is a material that is photocurable or photocrosslinkable. Photocrosslinking properties provide a way to directly cure the deposited materials, whereas in the conventional direct write or printed electronics, a post-baking process is required. In one embodiment, the present invention provides a sensor wherein a post-baking process is not required.

In particular embodiments, the prepolymer is selected from the groups consisting of cyclic trimehylolpropane formal acrylate, Cyclic Trimehylolpropane Formal Acrylate mixed with Acrylate Ester, Tango Plus (a commercially available photocurable material from Objet Co.), and mixtures thereof.

In some embodiments, the prepolymer is selected from propoxylated neopentyl glycol diacrylate, propoxylated glyceryl triacrylate, aromatic urethane acrylate, urethane acrylate, cyclic trimehylolpropane formal acrylate, acrylate easter, aromatic monoacrylate, ethoxylated bisphenon a dimethacrylate, and mixtures thereof. In some embodiments, the prepolymer is selected from commercial 3D Printing photopolymers such as Objet TangoBlackPlus Fullcure980, TangoPlus FullCure930, TangoBlack FullCure970, and TangoGray FullCure950, and mixtures thereof.

In one or more embodiments, the prepolymer is prepared by blending a photoinitiator with a monomer or oligomer in order to aid in the process of photocuring the prepolymer. The photoinitiator may be chosen from 2,2-dimethoxy-2-phenylacetophenone, acyl phosphine oxides, bisacryl phosphine oxides, bis(2,4,6-trimethylbenzoyl) phenylphophine oxide, benzoin ethyl ether, 5,7-diiodo-3-butoxy-6-fluorone, and mixtures thereof. In one or more embodiments, commercial 3D printing photopolymers can be used without using a photoinitiator. In one or more embodiments, commercial 3D printing photopolymers are mixed with an additional photoinitiator when it they are mixed with a monomer or oligomer.

In one or more embodiments, the conductive strips comprise from 0.01 or more to 20 or less weight percent (wt %) nanostructures, in another embodiment, from 0.05 or more to 15 or less weight percent (wt %) nanostructures, in another embodiment, from 0.5 or more to 10 or less weight percent (wt %) nanostructures and in yet another embodiment, from 1 or more to 5 or less weight percent (wt %) nanostructures, based upon the total weight of the conductive strips.

In one or more embodiments, the conductive strips comprise 0.01 or more weight percent (wt %) nanostructures, in another embodiment, 0.05 or more weight percent (wt %) nanostructures, in another embodiment, 0.5 or more weight percent (wt %) nanostructures and in yet another embodiment, 1 or more weight percent (wt %) nanostructures, based upon the total weight of the conductive strips.

In one or more embodiments, the conductive strips comprise 10 or less weight percent (wt %) nanostructures, in another embodiment, 7.5 or less weight percent (wt %) nanostructures, in another embodiment, 5 or less weight percent (wt %) nanostructures and in yet another embodiment, 3 or less weight percent (wt %) nanostructures, based upon the total weight of the conductive strips.

It is understood that the signals generated by a taxel comprising at least two conductive strips with material comprising a sensing layer disposed between the at least two conductive strips, is affected by the distance between the at least two conductive strips. Generally, shorter distances between any two conductive strips provides better sensor output, which includes greater sensitivity and reduced levels of noise. Thus, it is desirable to locate any two conductive strips that form a taxel as close to each other as possible, while maintaining other desirable properties such as durability, stretchability, shape, and the like.

In one or more embodiments, any two conductive strips forming a taxel are spaced apart by a distance of about 5.00 mm or less. In other embodiments, 4.00 mm or less. In other embodiments, 3.00 mm or less. In other embodiments, 2.00 mm or less. In other embodiments, 1.75 mm or less. In other embodiments, 1.50 mm or less. In other embodiments, 1.25 mm or less. In other embodiments, 1.00 mm or less. In other embodiments, 0.90 mm or less. In other embodiments, 0.80 mm or less. In other embodiments, 0.70 mm or less. In other embodiments, 0.60 mm or less. In other embodiments, 0.50 mm or less. In other embodiments, 0.45 mm or less. In other embodiments, 0.40 mm or less. In other embodiments, 0.45 mm or less. In other embodiments, 0.30 mm or less. In other embodiments, 0.45 mm or less. In other embodiments, 0.20 mm or less. In other embodiments, 0.45 mm or less. In other embodiments, 0.10 mm or less. In other embodiments, 0.09 mm or less. In other embodiments, 0.08 mm or less. In other embodiments, 0.07 mm or less. In other embodiments, 0.06 mm or less. In other embodiments, 0.05 mm or less. In other embodiments, 0.04 mm or less. In other embodiments, 0.03 mm or less. In other embodiments, 0.02 mm or less. In other embodiments, 0.01 mm or less.

In one or more embodiments, any two conductive strips forming a taxel are spaced apart by a distance of about 0.01 mm or greater. In other embodiments, 0.02 mm or greater. In other embodiments, 0.03 mm or greater. In other embodiments, 0.04 mm or greater. In other embodiments, 0.05 mm or greater. In other embodiments, 0.06 mm or greater. In other embodiments, 0.07 mm or greater. In other embodiments, 0.08 mm or greater. In other embodiments, 0.09 mm or greater. In other embodiments, 0.10 mm or greater. In other embodiments, 0.11 mm or greater. In other embodiments, 0.12 mm or greater. In other embodiments, 0.13 mm or greater. In other embodiments, 0.14 mm or greater. In other embodiments, 0.15 mm or greater. In other embodiments, 0.16 mm or greater. In other embodiments, 0.17 mm or greater. In other embodiments, 0.18 mm or greater. In other embodiments, 0.19 mm or greater. In other embodiments, 0.20 mm or greater. In other embodiments, 0.21 In other embodiments, 0.22 mm or greater. In other embodiments, 0.23 mm or greater. In other embodiments, 0.24 mm or greater. In other embodiments, 0.25 mm or greater. In other embodiments, 0.26 mm or greater. In other embodiments, 0.27 mm or greater. In other embodiments, 0.28 mm or greater. In other embodiments, 0.29 mm or greater. In other embodiments, 0.30 mm or greater. In other embodiments, 0.31 In other embodiments, 0.32 mm or greater. In other embodiments, 0.33 mm or greater. In other embodiments, 0.34 mm or greater. In other embodiments, 0.35 mm or greater. In other embodiments, 0.36 mm or greater. In other embodiments, 0.37 mm or greater. In other embodiments, 0.38 mm or greater. In other embodiments, 0.39 mm or greater. In other embodiments, 0.30 mm or greater. In other embodiments, 0.41 In other embodiments, 0.42 mm or greater. In other embodiments, 0.43 mm or greater. In other embodiments, 0.44 mm or greater. In other embodiments, 0.45 mm or greater. In other embodiments, 0.46 mm or greater. In other embodiments, 0.47 mm or greater. In other embodiments, 0.48 mm or greater. In other embodiments, 0.49 mm or greater. In other embodiments, 0.50 mm or greater. In other embodiments, 0.60 mm or greater. In other embodiments, 0.70 mm or greater. In other embodiments, 0.80 mm or greater. In other embodiments, 0.90 mm or greater. In other embodiments, 1.00 mm or greater. In other embodiments, 1.25 mm or greater. In other embodiments, 1.50 mm or greater. In other embodiments, 1.75 mm or greater. In other embodiments, 2.00 mm or greater. In other embodiments, 3.00 mm or greater. In other embodiments, 4.00 mm or greater. In other embodiments, 5.00 mm or greater.

As shown in FIG. 1A, conductive strips 14a and 14b form a first electrode of sensor 10 while first sensing layer 12 forms a first sensing aspect of sensor 10. Impedance and voltage can be measured across the strips 14a and 14b and first sensing layer 12, by the impedance measuring device 18a. Strip 14a, sensing layers 12 and strip 14b form a series circuit. The measuring device 18a measures impedance and voltage within the circuit. Conductive strips 14b and 14c form a second electrode of sensor 10 while second sensing layer 16 forms a second sensing aspect of sensor 10. Impedance and voltage can be measured across the strips 14b and 14c and second sensing layer 16, by the impedance measuring device 18b. Strip 14b, second sensing layer 16 and strip 14c form a series circuit. The measuring device 18b measures impedance and voltage within the circuit.

As discussed above, the conductive strips 14a and 14b and the conductive strips 14b and 14c each form taxels of sensor 10, while first sensing layer 12 forms a first sensing aspect of sensor 10, relative to conductive strips 14a and 14b, and second sensing layer 16 forms a second sensing aspect of sensor 10, relative to conductive strips 14b and 14c. Each of these taxels may be connected to the same impedance measuring device in a parallel arrangement. A schematic of this circuit arrangement is shown in FIG. 2B wherein R12 and R16 represent the resistance values associated with vertical taxel VT and horizontal taxel HT, respectively. The impedance measuring device thus receives the signals $V_{out1}$ and $V_{out2}$ as a combined signal through measuring the impedance and voltage within the circuit.

In one embodiment, sensor 10 of the present invention can be biomimetic in the sense that they can have mechanical compliance similar to human fingertips. Sensor 10 can also be used to detect force at distinct locations of applied pressure and slip. Furthermore, by examining the relative timing of the force signals from adjacent conductive strips, multiple sensors 10 can be used to detect slip and the direction that slip occurs. This is similar to the way that people can determine the direction that forces are applied through the relative timing of action potentials from mechanoreceptors within the fingertip.

The principle for detecting slip is based on the fact that high frequency mechanical vibrations occur when one object slips against another object. Different objects exhibit different vibrations in the frequency domain. Pressing an object against the surface of a tactile sensor (without slip) and sliding the same object against the surface of the sensor (to simulate slip) results in a difference in frequency. The difference in the frequency domain between these two tactile events can be characterized with a fast Fourier transform (FFT). The FFT can be performed with signal processing software on the raw, unfiltered voltage recorded from the output of the voltage divider to illustrate the differences between the slip and nonslip events in the frequency domain.

Sensors of the present invention can also distinguish between slip and nonslip events. In one embodiment, sensors of the present invention allow the force to be measured at distinct locations on the surface of the sensor with low cross talk.

By having different configurations of conductive strips with the sensing layers of the sensor, many different sensing mechanisms can be implemented. For example, sensors including conductive strips in multiple planes within a single sensing layer may be created. Wherein the impedance may be measured between any two conductive strips with a sensing material disposed therebetween. When a force is applied to the sensor, the relative distances between the various conductive strips will change, resulting in changes in resistance with the sensing layers disposed therebetween. By comparing the changes in resistance recorded by each impedance measuring device, the type and amount of the force applied to such a sensor can be determined according to the methods presently included in this application.

Without wishing to be bound by theory, it is understood that normal displacement of electrodes will create a higher change in resistance relative to applied shear forces.

Although the sensors embodied in FIG. 1 through FIG. 3, and FIG. 5 are generally rectangular, sensors of the present invention can take any shape. Sensors of the present invention can be cylindrical, conical, spherical, or combinations thereof. Sensors of the present invention can take any designed three-dimensional shape.

One embodiment of the present invention provides a method of producing a tactile sensor by locating two electrically conductive strips within the same plane within a first conductive soft polymer layer, and an additional electrically conductive strip located within a second conductive soft polymer layer. In a particular embodiment, a tactile sensor is produced by first preparing a first layer that includes insulating elastomeric or soft polymer material. The next step includes preparation of a first sensing layer that includes a first conductive soft polymer material and at least one electrically conductive strip. The next step includes preparation of a second sensing layer that includes a second conductive soft polymer material and at least two electrically conductive strips. In a final step, a fourth layer is prepared that includes insulating elastomeric or soft polymer material.

In one or more embodiments, the step of preparing the first and second sensing layers includes laying down the electrically conductive strips of the sensing layer being formed over the immediately preceding layer, then covering the electrically conductive strips of the sensing layer being formed with a conductive soft polymer material.

In one or more embodiments, the step of preparing the second sensing layers includes laying down a second conductive soft polymer material so as to fully cover the first sensing layer comprising a first conductive soft polymer material, then locating within the same plane of the conductive soft polymer material at least two electrically conductive strips, and wherein at least one of the at least two electrically conductive strips forms a plane with the at least one electrically conductive strip located in the first sensing layer.

In one or more embodiments, the first layer of insulating elastomeric or soft polymer material is formed by placing an appropriate elastomeric material into a mold to form the first layer. This first layer is then cured to set its form.

In one or more embodiments, the first layer of insulating elastomeric or soft polymer material can be formed using any curable elastomers in ambient conditions. In one or more embodiments, the first layer of insulating elastomeric or soft polymer material can be formed at room temperature and without the use of a vacuum. Preferably the first layer of insulating elastomeric or soft polymer material has a thickness/height from at least about 100 microns or more to at least about 5 mm or less, in other embodiments, from at least about 1 mm to at least about 5 mm and, in other embodiments, from at least about 1 mm or more to at least about 2 mm or less.

In one or more embodiments, after laying down the insulating elastomeric or soft polymer material, the next step in creating the sensing layers is to position conductive strips within the insulating elastomeric or soft polymer material of the sensing layer. The conductive strips comprise conductive nanostructures dispersed in a flexible support material. The conductive nanostructure is selected from the group consisting of include conductive nanowires, carbon nanotubes (CNTs), graphene, and or combination thereof. First, the flexible support material and the conductive nanostructure mixture must be made. The flexible support material comprises a combination of suitable prepolymer and a photoinitiator. The conductive nanostructure/flexible support mixture is formed by combining the selected conductive nanostructure with the selected prepolymer and photoinitiator where necessary. The mixture is then mixed until the conductive nanostructure is sufficiently dispersed within the flexible support mixture.

In one embodiment, the photoinitiator is first blended with the prepolymer using a magnetic stirrer. Then, the selected conductive nanostructures are dispersed into the prepolymer solution.

In one or more embodiments, the mixture is sonicated to improve the dispersion of the selected conductive nanostructure. During sonication, ultrasound propagation in the solution results in growth of cavities. The implosion of these cavities leads to violent and localized release of energy which can separate and disperse individual conductive nanostructures from bundles and agglomerates, where cavitation and wave propagation are directly related to the viscosity of liquid. Non-uniform energy release distribution during sonication leads to weak and non-homogeneous dispersion especially in medium to high viscosity liquid. A combination of a sonicator and magnetic stirrer can be used to globally disperse the conductive nanostructures in the prepolymer. In one or more embodiments, the prepared solution can be degassed under a vacuum. In one embodiment, the solution is degassed for 5 hours. In some embodiments, the mixture is sonicated (Q700, Qsonica, Newtown, CT) for 90 min and filtered using a 200 micron filter (Sterlitech, Kent, WA).

The conductive strips can be positioned within the same plane within the first and second sensing layers using any technology known in the art. The conductive strips are ultimately cured and can be cured by any technology known in the art. In one or more embodiments, the deposited materials are directly cured. In one or more embodiments, the conductive strips are cured using UV, visible, or infrared light depending on the photoinitiator selected. Other methods of curing the conductive strips include thermal curing using a thermal initiator, such as 2,2'-azobis(2-methyl-propionamidine) dihydrochloride, 2,2'-azobis(2-methylpropionitrile), benzoyl peroxide, and mixtures thereof.

In one embodiment, the conductive strips are located within the same plane within the first and second sensing layers using direct-write technology. Direct-write (DW) technology is a maskless process to create conductive patterns on virtually any surface. With this technology, translation mechanisms are utilized to position a dispensing head to extrude a conductive material which forms a functional wire pattern.

A direct-write system comprises a micro-dispensing tip and a means for directly curing the dispensed material. Direct-write applications include robotic tactile sensors and soft molding.

In one embodiment, sensors of the present invention are prepared by a computer controlled DW system using a screw-driven micro-dispensing head (PCD3, GPD Global, Grand Junction, CO) installed on a high precision xyz translation stage with a 500 nm resolution (Aerotech, Pittsburgh, PA). Then, a four-leg optical fiber with a high-power UV lamp (OmniCure S2000, Lumen Dynamics Group Inc., Ontario, Canada) can be installed around the dispensing head to directly cure the dispensed material.

One schematic of the developed DW system comprises the xyz stage, micro-dispensing device, and curing system. Controlling the speed of the xyz stage, the gap distance between the tip and substrate, and the dispensing speed regulated by the input voltage of the dispensing head can be used to form a precise and consistent shape of deposited sensor elements.

In one or more embodiments, the electrically conductive strips or wires possess a consistent width throughout the length of each strip. Dispensing parameters directly affect the size and resolution of the dispensed material. Several parameters affect the ability to maintain continuous and smooth flow of the material delivered from the dispensing tip to the substrate surface. The width of the strips decreases as the flow rate increases and too low flow rate does not create consistent and continuous line widths. Another parameter is the translation speed. Translation speed is the speed of the stage underneath the dispensing tip. In one embodiment the translation speed is from 20 mm/sec or more to 30 mm/sec or less. In one embodiment the translation speed is 15 mm/sec or more and in other embodiments the translation speed is 35 mm/sec or less. High flow rates and slow translation speeds result in inconsistent line widths of conductive elements. Excessively fast translation speed and slow fluid flow rate also creates discontinuous or inconsistent line widths.

Variation of the gap distance between the tip and the substrate also causes inconsistent line widths. Where polyurethane material is used as the substrate, the surface is flexible with a relatively broad surface area. Here, small variations in gap distance are unavoidable. However, the use of a highly accurate and uniform substrate and/or real-time distance measurement device installed in the dispensing head would be a method to reduce this variation in gap distance, thereby giving more consistency to the line width.

Material agglomeration generated during the dispersion process is another source of line width variation. The agglomerated material sometimes partially occluded the tip and resulted in a pressure change in the tip. This pressure change caused inconsistent line widths. The material agglomeration can be improved by using a better material dispersion process and chemicals such as surfactants and/or dispersants.

Several sets of preferred parameters can be chosen to achieve consistent line widths. In one embodiment, the parameters are a flow rate from about 0.16 ml/V-min or more to 0.18 ml/V-min or less, translation speed of about 20 mm/s, and a line width of about 0.8 mm.

After curing the at least one conductive strip, the conductive intermediate polymeric material is cured to form the sensing layer.

After curing the second sensing layer, the fourth layer including an insulating elastomeric or soft polymer material can be formed using any curable elastomers in ambient conditions.

This material design enables the fabrication of mechanically compliant and electrically conductive tactile sensors. Advantageously, tactile sensors of the present invention are mechanically compliant to facilitate delicate grasping procedures and to be more suited for a wider range of applications.

Sensors of the present have many beneficial applications. These applications include any robotic system where control of force is required (e.g. assembly lines), diagnostics (e.g. determining if antilock brakes prevent slip), prosthetic limbs, conformal or wearable electronics (e.g. head-band thermometer), biomedical instruments and measurement (e.g. foot pressure measurement for customized shoes, body-type collection chair, bedsore-free bed), electronics embedded in structural components, and implantable electronics with biocompatible materials.

In light of the foregoing, it should be appreciated that the present invention significantly advances the art by providing a tactile sensor that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

Examples

In order to demonstrate the practice of the present invention, the following examples have been prepared and tested. The examples should not, however, be viewed as limiting the scope of the invention. The claims will serve to define the invention.

Formulations 1-6

Embodiments of the present invention were created according to the procedures described below. A commercially available photocurable resin, TangoPlus (Stratasys, Eden Prairie, MN) showed reliable performance for stretchable force sensors and was used in Formulations 1-6. In Formulations 1-6 the photoinitiator and crosslinking agent have been combined in different ratios with the acrylate-based monomers. The material formulations are shown in Table 1.

TABLE 1

Formulations for different basic elastomers (all components are described with wt. %)

| Ingredient | Type | Form 1 | Form 2 | Form 3 | Form 4 | Form 5 | Form 6 |
| --- | --- | --- | --- | --- | --- | --- | --- |
| 2-[[(butylamino)carbonyl]oxy]ethyl acrylate | Monomer | 73.0 | 74.0 | 73.1 | 74.6 | 83.8 | 83.0 |
| Di(ethylene glycol) ethyl ether acrylate | Monomer | 5.0 | 5.0 | 4.0 | 5.0 | 15.0 | 15.0 |
| Isobornyl acrylate | Monomer | 20.0 | 20.0 | 20.0 | 20.0 | 0.0 | 0.0 |
| Phenylbis(2,4,6-trimethyl-benzoyl)phosphine oxide | Photoinitiator | 0.4 | 0.4 | 0.4 | 0.4 | 0.4 | 0.4 |
| Glycerol propoxylate (1PO/OH) triacrylate | Crosslinker | 1.6 | 0.6 | 2.5 | 0.0 | 0.8 | 1.6 |

Sensors were fabricated using Formulations 1-6 as a base polymer matrix. To obtain the optimum base formulation, mechanical and sensing tests were performed on Formulations 1-6 as well as the reference material, commercially available photocurable resin—TangoPlus. For the tensile test, dog bone-shaped specimens were fabricated using a mold according to the dimensions given in ASTM D638 for a Type V tensile test specimen. An Instron 5582 universal testing machine was used for a tensile test at a crosshead speed of 100 mm/min. Also, the hardness of all the polymerized samples was measured using a Shore A durometer.

The formulations without isobornyl acrylate (Formulation 5 and Formulation 6) showed lower strength. Formulations 5 and 6 were observed to crack under deformation. Formulation 4 which included no crosslinking agent was too soft and therefore exhibited a very long recovery time after elastic deformation.

An ionic liquid (IL), 1-ethyl-3-methyl-imidazolium tetrafluoroborate (EMIMBF4), was mixed with Formulation 1 to prepare the IL/polymer blend for the X-sensitive and Z-sensitive IL-based layers. For the CNT-based electrodes, a CNT/polymer composite was prepared based on the Formulation 1 composition and 2 wt. % of a thermal initiator (TRIGONOX 125C75, obtained from Akzo Nobel Functional Chemicals LLC, Chicago, IL) added to make it thermally curable.

Multi-layer multi-material sensors were formed with the following structures. On top and bottom, sensors had insulation layers. The two intermediate pressure-sensitive layers are made with an ionic liquid (IL) and polymer blend. Finally, a carbon nanotube (CNT)-based polymer composite was used for electrode fabrication. All these layers exhibit flexibility and stretchability after polymerization. Three electrodes were included in the sensor, where two of them are placed in the same horizontal layer with an IL/polymer network between them. These two electrodes and the IL/polymer between them created a horizontal tactile-pixel (taxel). This taxel was referred to as an X-taxel. The third electrode was placed below one of the electrodes in X-taxel with an IL/polymer network between them. This vertical taxel was referred to as a Z-taxel.

Figure 5:
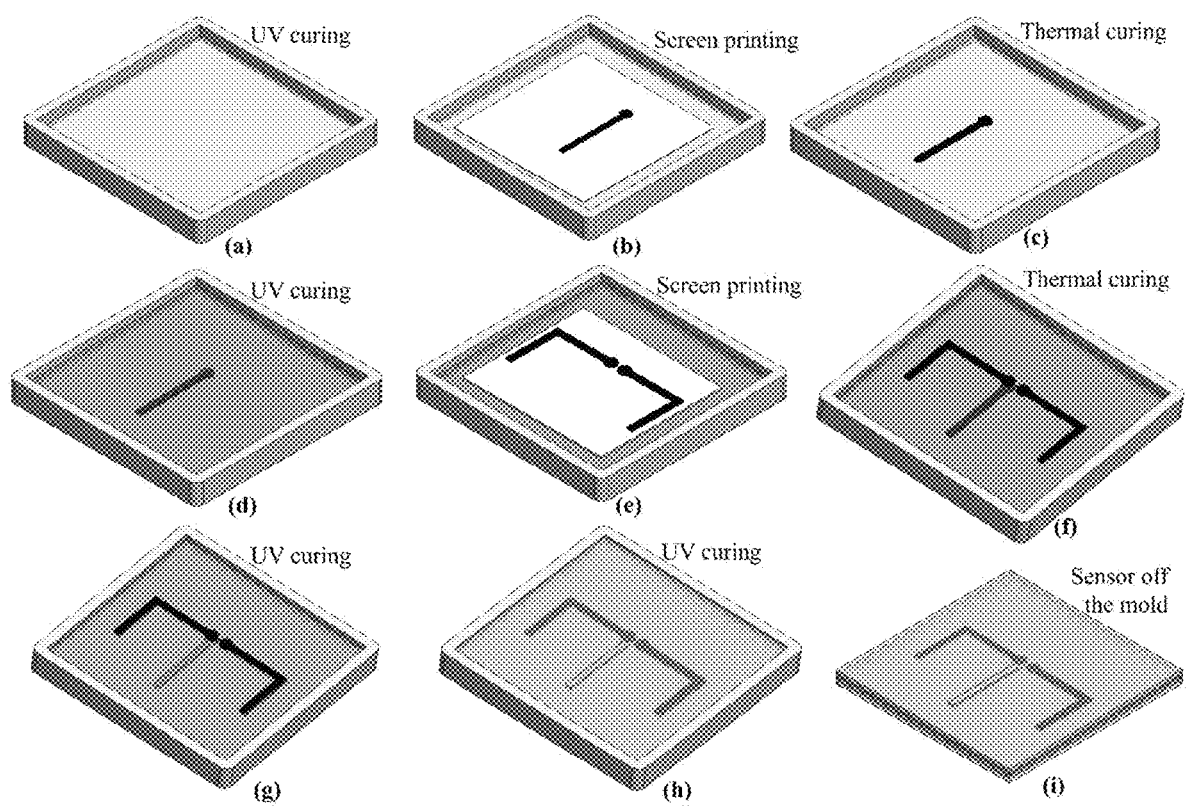
FIG. 5 is a schematic diagram showing the method of forming a sensor according to an embodiment of the present invention.

As shown in FIG. 5, the sensor was fabricated using an aluminum mold. The processes used for fabrication include: ultra-violet (UV) curing of pre-polymer liquids; screen-printing of CNT-based electrodes; and thermal curing of the electrodes. The step-by-step process to fabricate a combined X and Z taxel sensor was as follows. First, the insulation material (Formulation 1 prepolymer) was poured into the mold to make a thin layer (less than 1 mm thick). The prepolymer liquid was exposed to UV light to polymerize and create a soft layer (FIG. 5 (a)). Next, a paper mask was used to screen print the CNT-based electrode (FIG. 5 (b)). The electrode was thermally cured by putting the mold in a convection oven (FIG. 5 (c)). The IL/pre-polymer blend was poured into the mold and UV-cured to make the Z-sensitive layer (FIG. 5 (d)). Electrodes for the X-taxel were screen printed using another paper mask and were thermally cured in the oven (FIG. 5 (e)). Next, another IL/prepolymer blend was poured and UV-cured for the X-sensitive layer (FIG. 5 (f)). Finally, an insulation layer was created by UV curing, and the sensor was removed from the mold (FIG. 5 (g) through (h)).

For normal force, a 2-mm probe displacement (around 66% compressive strain) was applied on the Z-taxel sensor at 0.5 mm/s speed in the vertical (Z) direction. For shear, a 2-mm probe displacement was applied on an X-taxel sensor at 0.5 mm/s speed in the horizontal (X) direction with an initial compressive load of 2 N.

The sensor based on Formulation 2 showed good sensitivity. However, it showed a long recovery time while unloading, especially, for the shear test with the X-taxel sensor. The sensor based on Formulation 3 showed lower sensitivity compared to Formulation 1 and Formulation 2. Therefore, Formulation 1 was selected as the base material and was used for sensor fabrication for the following experiments.

For CNT-based electrodes, different weight percentages of CNT with Formulation 1 were investigated to check the conductivity and percolation threshold. To prepare conductive ink, 1 wt. %, 3 wt. %, 5 wt. %, and 10 wt. % CNT was dispersed in Formulation 1. The effect of the CNT loading ratio on electrical conductivity was investigated with and without strain. CNT/polymer composite strips were screen printed with a dimension of 30 mm×1 mm×0.2 mm. Resistance was measured using a multimeter without any strain and under 30% compressive strain. The 5 wt. % CNT showed optimum electrical resistance. Therefore, a 5 wt. % CNT ratio was used to prepare CNT/polymer composites for electrode fabrication.

Z-Taxel Characterization

Figure 6A:
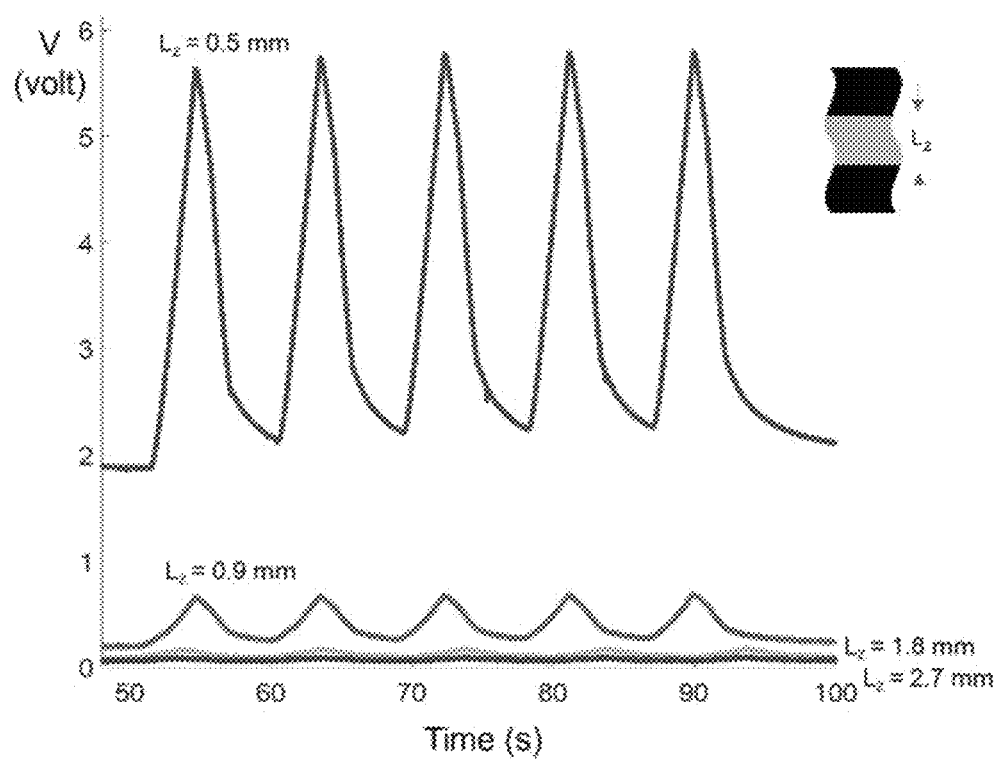
FIG. 6A is a graph showing the measured voltage over time for a vertical taxel with results for different spacings of conductive strips.

For Z-taxel characterization, a sensor was fabricated only with a Z-taxel. The Z-taxel sensor had only one IL-based layer sandwiched between two electrodes. To test the sensor, a force gauge was mounted on a motorized linear stage that moved in the Z axis. A probe was attached to the force gauge that was used for applying force or strain on the sensor. The probe displacement in the Z direction is denoted by $\delta z$. To apply normal compressive deformation, $\delta z$ of 2 mm was applied using the Z stage movement. First, sensors for Z-taxel characterization were fabricated with different IL concentrations. The Z-taxel sensors with 1, 2, and 5 wt. % of IL concentrations were fabricated with Formulation 1 material. While all the sensors showed reliable sensitivity, sensor response did not significantly vary between IL concentrations of 1 to 5 wt. %. Second, sensors for Z-taxel characterization were fabricated with IL concentration maintained at 2 wt. % to measure the effect of distance between electrodes, Lz. Sensors were fabricated with 0.5 mm, 0.9 mm, 1.8 mm, and 2.7 mm values of Lz. A fixed compressive force of 15 N was applied on sensors with different Lz at a probe speed of 0.5 mm/s. FIG. 6A shows the test result for different IL layer thicknesses, Lz. As shown in FIG. 6A, a shorter distance between electrodes provides higher sensitivity in the Z-taxel.

X-Taxel Characterization

Figure 6B:
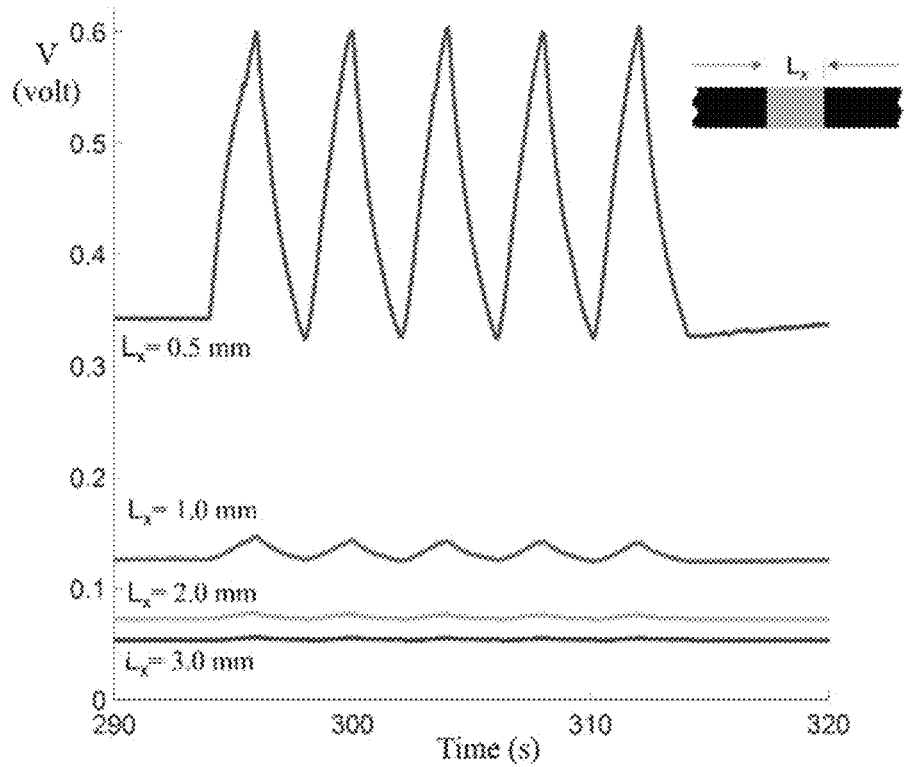
FIG. 6B is a graph showing the graph showing the measured voltage over time for a horizontal taxel with results for different spacings of conductive strips.
Figure 7:
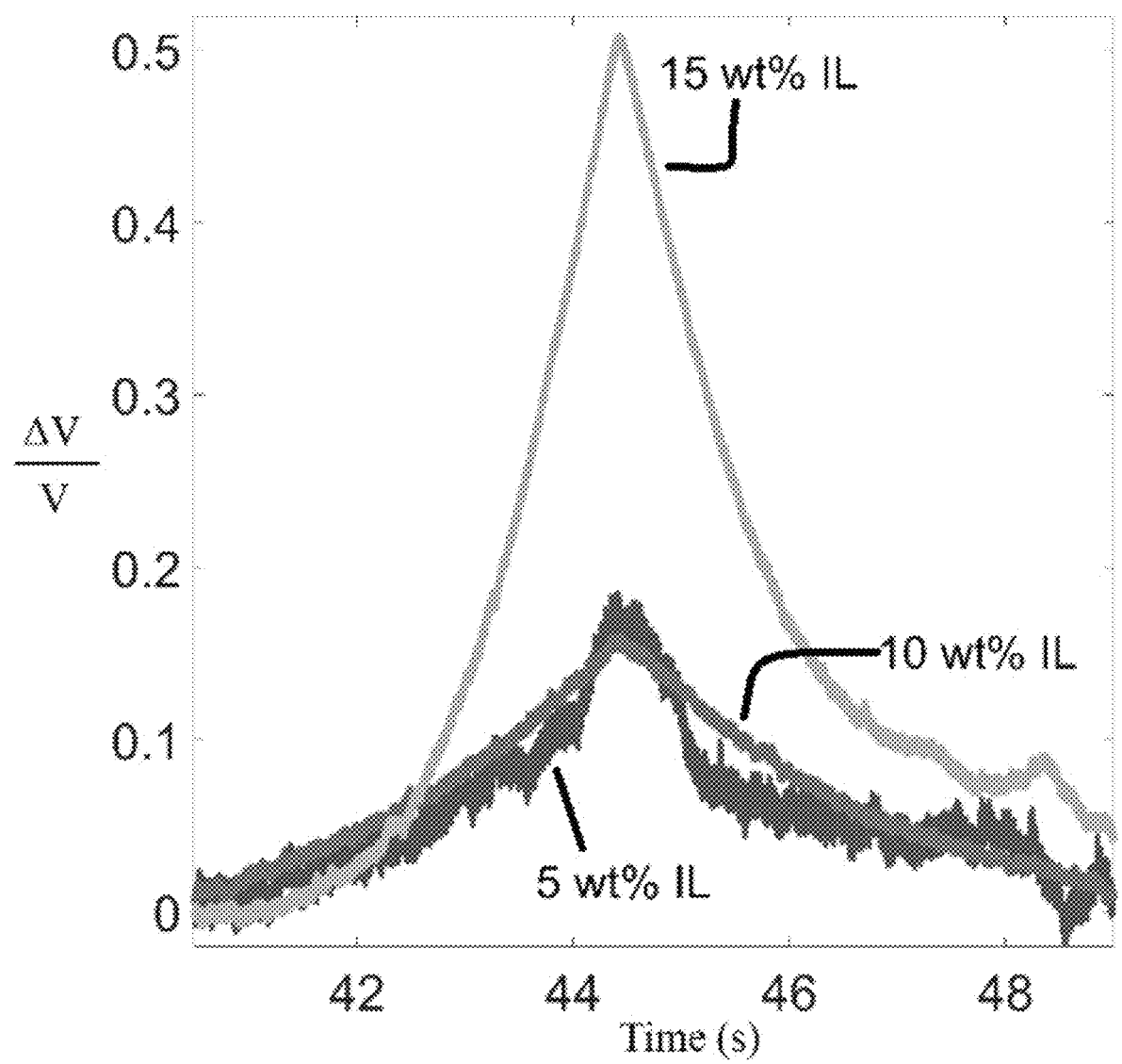
FIG. 7 is a graph showing the showing the measured voltage over time for a taxel with results for different ionic liquid amounts by weight percent.

An X-taxel sensor was characterized for different IL concentrations and electrode distances similar to the above procedures used for Z-taxel characterization. In an X-taxel sensor, electrodes are placed in the same horizontal layer as the IL/polymer network. Sensors formed for X-taxel characterization were formed without any Z-taxel. The X-taxel sensor was designed primarily to respond to any applied shear on the sensor. To apply shear, the sensor was glued with the base platform on one side and with the force probe on the other side. The force gauge was mounted on a motorized Z-stage, and the Z-stage was mounted on an X-stage. X-taxel sensors with IL concentrations of 5, 10, and 15 wt. % were evaluated. The probe displacement in the X direction is denoted by $\delta x$. To test the shear response, a $\delta x$ of 2 mm was applied with an initial compressive load of 0.5 N. The X-stage was moved back and forth at a speed of 0.5 mm/s. As shown in FIG. 7, the X-taxel sensor with 15 wt. % of IL showed the highest sensitivity. The sensor with 10 wt. % IL concentration also showed a reliable response, while the 5 wt. % IL showed significant electrical noise. The distance between electrodes, Lx, was also examined. Sensors with 10 wt. % IL were fabricated with the Lx values of 0.5 mm, 1.0 mm, 2.0 mm, and 3.0 mm. They were tested under the same condition with a $\delta x$ of 2 mm. FIG. 6B shows that sensitivity decreases with the increase of electrode distance. The sensor with 0.5 mm Lx showed the highest sensitivity while 1.0 mm Lx demonstrated a reliable response. Sensors were not sensitive with higher distances (Lx=2.0 mm and 3.0 mm).

X and Z Taxel Performance

The test setup for a combined X and Z taxel sensor included a Mark-10 ESM 303 motorized force testing stand with M5-2 force gauge (Mark-10 Corporation, Copiague, N.Y., USA) used to control the vertical (Z) motion and to collect force data as well as placing the sensor on an A-LSQ075AE01 motorized linear stage (Zaber Technologies, Vancouver, B.C., Canada), which was used as an X-motion stage to apply shear. The X and Z taxels of the sensor were connected to a potential divider with an external resistor of 20 MΩ. A USB-6212 data acquisition system (DAQ) from National Instruments (Austin, Texas, USA) and E3630A external power supply (Keysight Technologies, Santa Rosa, Calif., USA) were used to read sensor response and supply voltage, respectively. The supply voltage was maintained at 24 V. The instrumentation and data acquisition were conducted using LabVIEW software.

Figure 8:
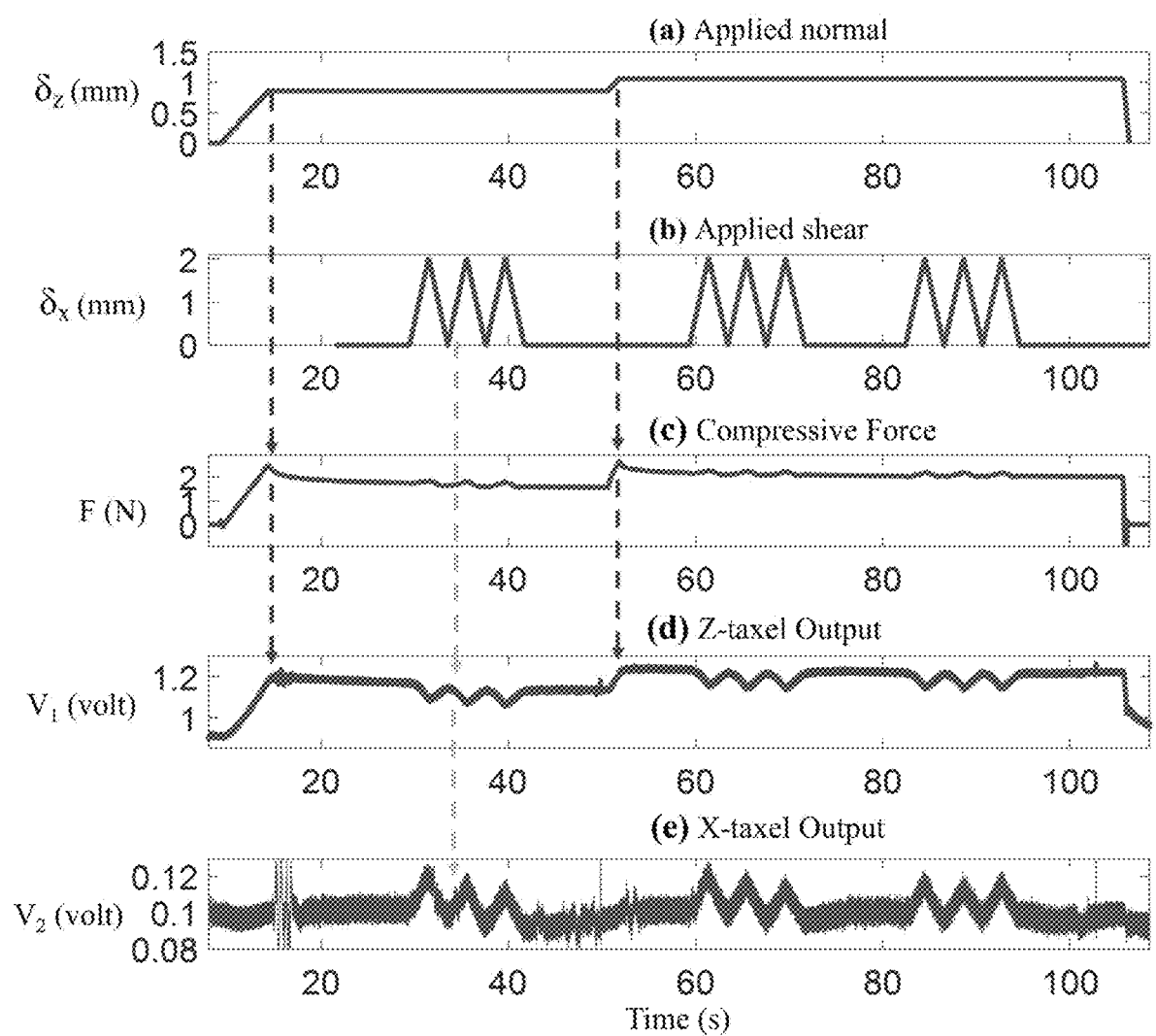
FIG. 8 is a series of graphs relating to the deformation in the vertical direction, the deformation in horizontal direction, the compressive force applied, the observed voltage for the Z-taxel (vertical taxel), and the observed voltage for the X-taxel (horizontal taxel) as a function of time.

A combination sensor was fabricated for simultaneous normal and shear measurement. The combination sensor had two layers with IL disposed therein. One layer with 10 wt. % IL and 1.0 mm electrode distance was fabricated for an X-taxel and shear detection. Another layer with 2 wt. % IL and 0.9 mm electrode distance was fabricated for a Z-taxel and normal force measurement. The circuitry of the combined X-Z-taxel sensor is shown in FIG. 2B. Voltage output V1 and V2 are affected by the strain applied in the X or Z direction. By inspecting these two voltage outputs, the nature of strain can be defined. FIG. 8 shows the performance results for a combination sensor. Initially, around 1 mm of δz was applied FIG. 8 (a). As a result, normal compressive force increased as observed in FIG. 8 (c). FIG. 8 (d) and (e) show the Z and X taxel output, respectively. With the initial δz and compressive normal force, FIG. 8(d) shows the normal taxel output where voltage increases according to applied normal strain. Next, a set of three shear cycles was applied by applying a δx of 2 mm three times as shown in FIG. 8 (b). The δx affected both Z and X taxels. Because of the shear effect, the normal taxel voltage went down due to the increase in resistance. However, the X taxel voltage goes up as one electrode moved closer to the other in the same layer. Voltage reduction only in normal taxel fails to provide enough information to detect the shear, since the reduction can come from unloading in the Z direction. Combining Z and X taxel outputs in FIGS. 8 (d) and (e) gives enough information to define the nature of the strain.

In the above examples, the IL/polymer network in the sensor works as the primary sensitive layer where its electrical resistance changes under deformation. Without wishing to be bound by theory, it is proposed that the operating mechanism of investigated IL/polymer-based sensor includes a polymer network that contains abundant urethane functional groups which can act as hydrogen bond donors, thus non-covalent interaction based on hydrogen bonds between urethane groups and tetrafluoroborate (BF4−) would be formed. Before the application of external force, most of the cations and anions (i.e., EMIM+ and BF4−) are confined inside the polymer network due to hydrogen bonds and coulomb forces. The reduced mobility of ion pairs accounts for the initial high electric resistance of the investigated device. Under external pressure, hydrogen bonds between ionic liquids and polymer side chains (i.e., urethane groups) can serve as energy dissipation sites by cleaving the hydrogen bonds. Moreover, the distance between the two electrodes decreases, which would increase the intensity of the electric field and thus promote an ion pumping process, during which EMIM+ and BF4− ion pairs are detached from the polymer network. The overall pressure-induced hydrogen-bond breakage and ion-pumping process increase the electrical conductivity of the sensor. This deformation-based conductivity change works as the core sensing mechanism for both normal and shear forces on the sensor.

The results show reliable sensor performance for Formulation 1. While Formulation 1 performed close to TangoPlus, other formulations demonstrated issues such as cracks, long recovery time, and unreliable response. Base polymer selection is crucial for CNT/polymer composite formation as it can very easily affect the sensor performance. In these examples, Formulation 1 was selected as the base formulation and 5 wt. % CNT was dispersed into it. This CNT/prepolymer was used to screen print the electrodes. The obtained electrodes showed good electrical conductivity and mechanical strength.

Other materials and compositions may be selected depending on the final application of the sensor. For example, the amount of crosslinker can be slightly adjusted to obtain different hardnesses. Further, the isobornyl acrylate ratio could also be adjusted to modulate the strength of the polymer and the sensor. As observed in the above experiments, the sensor response depends on the IL ratio in the IL/polymer membrane, especially, for shear sensing. A very low IL ratio generates electrical noises that is detrimental to the sensor performance. The geometric configuration also significantly influences sensor response. A lower distance between electrodes provides higher sensitivity, whereas a higher distance shows lower sensitivity and increased electrical noises. Hysteresis loss during sensor unloading was observed in the above experiments. This is common in viscoelastic elastomers because of their time-dependent elastic properties. Overall, the Z-taxel and the X-taxel sensors showed very predictable and consistent paths in loading and unloading for multiple cycles.

Various modifications and alterations that do not depart from the scope and spirit of this invention will become apparent to those skilled in the art. This invention is not to be duly limited to the illustrative embodiments set forth herein.

What is claimed is:

1. A tactile sensor comprising:
   a first insulating layer having a first and second major surface formed from a non-conductive material;
   a first sensing layer comprising a first conductive soft polymer material and a first electrically conductive strip located within the first sensing layer, and wherein said first sensing layer is positioned above said first insulating layer;
   a second sensing layer comprising a second conductive soft polymer material and second and third electrically conductive strips separated by the second conductive soft polymer material and arranged within a first plane located within the second sensing layer, where the first and second electrically conductive strips are separated by the first conductive soft polymer and are arranged within a second plane transverse to the first plane and wherein said second sensing layer is positioned above said first sensing layer;
   a second insulating layer formed from a non-conductive material positioned above said second sensing layer; and
   wherein the first conductive soft polymer material has a first intrinsic conductivity, wherein the second conductive soft polymer material has a second intrinsic conductivity, wherein the first and second intrinsic conductivities are different, wherein both the first and second electrically conductive strips are connected to a first impedance measuring device, wherein both the second and third electrically conductive strips are connected to a second impedance measuring device.

2. The tactile sensor of claim 1, wherein the first and second electrically conductive strips are separated by a distance of 0.01 mm or greater.

3. The tactile sensor of claim 1, wherein the second and third electrically conductive strips are separated by a distance of 0.01 mm or greater.

4. The tactile sensor of claim 1, wherein said first and second electrically conductive strips include conductive nanostructures dispersed in a flexible support material, wherein said conductive nanostructures are selected from the group consisting of conductive nanowires, carbon nanotubes, and graphene, and wherein said carbon nanotubes are selected from the group consisting of multi-walled carbon nanotubes or single wall carbon nanotubes.

5. The tactile sensor of claim 4, wherein said electrically conductive strips contain from 0.01 wt % to 20 wt % carbon nanotubes and wherein said carbon nanotubes have an average length from 300 nanometers to 30 microns.

6. The tactile sensor of claim 1, wherein the first and second conductive soft polymer materials are selected from the group consisting of polymers containing ionic compounds, including ionic liquids and ionic salts, ionic particle based soft conductive polymers, and soft polymer having intrinsic conductivity.

7. The tactile sensor of claim 6, wherein the first conductive soft polymer material is a polymer containing ionic compounds selected from the group consisting of 1-ethyl-3-methylimidazolium tetrafluoroborate (EMIBF4) with the $T_g$ of −95.15° C.; 1-ethyl-3-methylimidazolium bis(trifluoromethylsulfonyl) imide (EMITFSI) with the $T_g$ of −98.15° C.; and 1-butylpyridinium tetrafluoroborate (BPBF4) with the $T_g$ of −66.7° C.

8. The tactile sensor of claim 1, wherein the second conductive soft polymer material is a polymer containing ionic compounds selected from the group consisting of 1-ethyl-3-methylimidazolium tetrafluoroborate (EMIBF4) with the $T_g$ of −95.15° C.; 1-ethyl-3-methylimidazolium bis(trifluoromethylsulfonyl) imide (EMITFSI) with the $T_g$ of −98.15° C.; and 1-butylpyridinium tetrafluoroborate (BPBF4) with the $T_g$ of −66.7° C.

9. The tactile sensor of claim 6, wherein the weight percent of the ionic liquid based upon the total weight of the ionic liquid polymer within the sensing layers is selected from the group consisting of from 0.01 or more to 10 or less weight percent (wt %) of ionic liquid, from 0.05 or more to 7.5 or less weight percent (wt %) ionic liquid, from 0.5 or more to 5 or less weight percent (wt %) ionic liquid, and from 1 or more to 2.5 or less weight percent (wt %) ionic liquid.

10. The tactile sensor of claim 6, wherein the ionic liquid polymer is a pressure sensitive polymer.

11. The tactile sensor of claim 1, wherein the first and second impedance measuring device are voltage dividers.

12. The tactile sensor of claim 1, wherein said first insulating layer and said second insulating layer are stretchable.

13. The tactile sensor of claim 1, wherein the non-conductive material of said first insulating layer and the non-conductive material of said second insulating layer are selected from the group consisting of elastomers, polymers, and thermoplastics, wherein the elastomers are selected from the group consisting of polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluoresilicone, fluoroelastomers, perfluorelastomers, polyether block amines, chlorosulfonated polyethylene, ethylene-vinyl acetate, thermoplastic elastomer, polyurethane, and mixtures thereof, and wherein the non-conductive material of said first insulating layer can be the same or different than the non-conductive material of said second insulating layer.

14. The tactile sensor of claim 1, wherein the tactile sensor detects:
  a. applied force of normal and shear forces,
  b. proximity of the applied force,
  c. slip events,
  d. slip direction,
  e. slip speed,
  f. slip velocity,
  g. temperature changes,
  h. rolling contact,
  i. shape of an object in contact with said tactile sensor, and
  j. vibration.

15. The tactile sensor of claim 1, wherein said first electrically conductive strip and said third electrically conductive strip are connected to a third impedance measuring device.

16. A method of making the tactile sensor of claim 1, the method comprising:
  (a) preparing the first insulating layer by pouring a first insulating soft polymer formed from a non-conductive material into a first mold;
  (b) curing the insulating soft polymer to from the first insulating layer;
  (c) preparing the first sensing layer by:
    (i) depositing a mixture of prepolymer and carbon nanotubes into a second mold on top of the first insulating layer to form a first array of conductive strips including the first electrically conductive strip;
    (ii) curing the first array of conductive strips;
    (iii) pouring a first conductive soft polymer material into the second mold to cover the first array of conductive strips;
    (iv) curing the first conductive soft polymer material to form the first sensing layer;
  (d) preparing the second sensing layer by:
    (i) depositing a mixture of prepolymer and carbon nanotubes into a third mold on top of the first sensing layer to form a second array of conductive strips including the second electrically conductive strip and the third electrically conductive strip;
    (ii) curing the first array of conductive strips;
    (iii) pouring a second conductive soft polymer material into the third mold to cover the second array of conductive strips;
    (iv) curing the second conductive soft polymer material to form the second sensing layer;
  (e) preparing the second insulating layer by pouring a second insulating soft polymer formed from a non-conductive material into a third mold on top of the second sensing layer;
  (f) curing the second insulating soft polymer to form the second insulating layer;
  (g) connecting the first conductive strip of the first array of conductive strips and the second conductive strip of the second array of conductive strips to the first impedance measuring device; and
  (h) connecting the second conductive strip of the second array of conductive strips and the third conductive strip of the second array of conductive strips to the second impedance measuring device.

17. The method of claim 16, wherein the mixture of prepolymer and carbon nanotubes is deposited via a microdispensing head, or screen printing and wherein the deposited mixture is directly cured into strips using UV light or thermal curing.

18. The method of claim 16, wherein the first and second conductive soft polymers are selected from the group consisting of ionic-liquid polymer, particle based soft conductive polymers, and soft polymers having intrinsic conductivity.

19. The method of claim 17, wherein the first and second conductive soft polymer materials are an ionic-liquid polymer selected from the group consisting of 1-ethyl-3-methylimidazolium tetrafluoroborate (EMIBF4) with the Tg of −95.15° C.; 1-ethyl-3-methylimidazolium bis(trifluoromethylsulfonyl) imide (EMITFSI) with the Tg of −98.15° C.; and 1-butylpyridinium tetrafluoroborate (BPBF4) with the Tg of −66.7° C.

20. The method of claim 16, wherein the non-conductive material of said first insulating soft polymer material and the non-conductive material of said second insulating soft polymer material are selected from group consisting of elastomers, polymers, and thermoplastics, wherein the elastomers are selected from the group consisting of polyepoxides rubber, natural polyisoprene, synthetic polyisoprene, polybutadiene, chloroprene rubber, butyl rubber, styrene-butadiene rubber, nitrile rubber, ethylene propylene rubber, epichlorohydrin, polyacrylic rubber, silicone rubber, fluorosilicone, fluoroelastomers, perfluorelastomers, polyether block amines, chlorosulfonated polyethylene, ethylene-vinyl acetate, thermoplastic elastomer, polyurethane, and mixtures thereof, and wherein the non-conductive material of said first insulating soft polymer material can be the same or different than the non-conductive material of said second insulating soft polymer material.

\* \* \* \* \*